United States Patent [19]

Atsukawa

[11] 3,752,897

[45] Aug. 14, 1973

[54] DEVICE FOR MANUFACTURING IRON OR NON-ORE-SMELTING TYPE

[76] Inventor: Masami Atsukawa, 14-3, 2-chome, Tsukushino, Machida-shi, Tokyo, Japan

[22] Filed: June 17, 1971

[21] Appl. No.: 153,947

[52] U.S. Cl............................ 13/20, 13/23, 13/25, 263/28
[51] Int. Cl......... F27b 9/12, F27d 3/00, H05b 3/60
[58] Field of Search........................... 13/20, 23, 25; 219/50; 263/28

[56] References Cited
UNITED STATES PATENTS

| | | | |
|---|---|---|---|
| 3,260,513 | 7/1966 | Connell | 263/28 |
| 1,107,478 | 8/1914 | Bayard | 13/20 |
| 2,853,288 | 9/1958 | Hudson | 263/28 X |

Primary Examiner—Roy N. Envall, Jr.
Attorney—E. F. Wenderoth et al.

[57] ABSTRACT

A device for manufacturing iron, in which by supplying an alternating current directly to the accumulation of a preheated iron-manufacturing raw material in the form of powder and particles a high-density current concentrated locally in the accumulation is formed. The reduction of iron oxide is carried out by applying Joule heat and electromagnetic force caused by the high density current to the raw material for manufacturing iron through which the current is flowing, thereby to soften a gangue material and simultaneously to aggregate iron particles, whereby in a non-ore-smelting state the iron in the form of a bare rod or particles is separated from the gangue material in the form of pumice.

17 Claims, 22 Drawing Figures

MASAMI ATSUKAWA,

INVENTOR

BY *Wendroth, Lind & Ponack*

ATTORNEYS

MASAMI ATSUKAWA,
INVENTOR

MASAMI ATSUKAWA,
INVENTOR

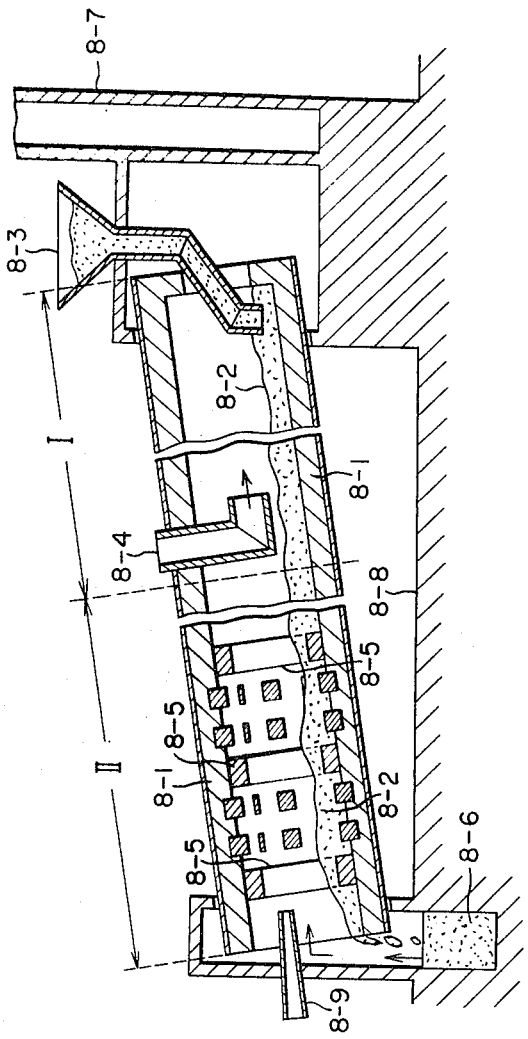

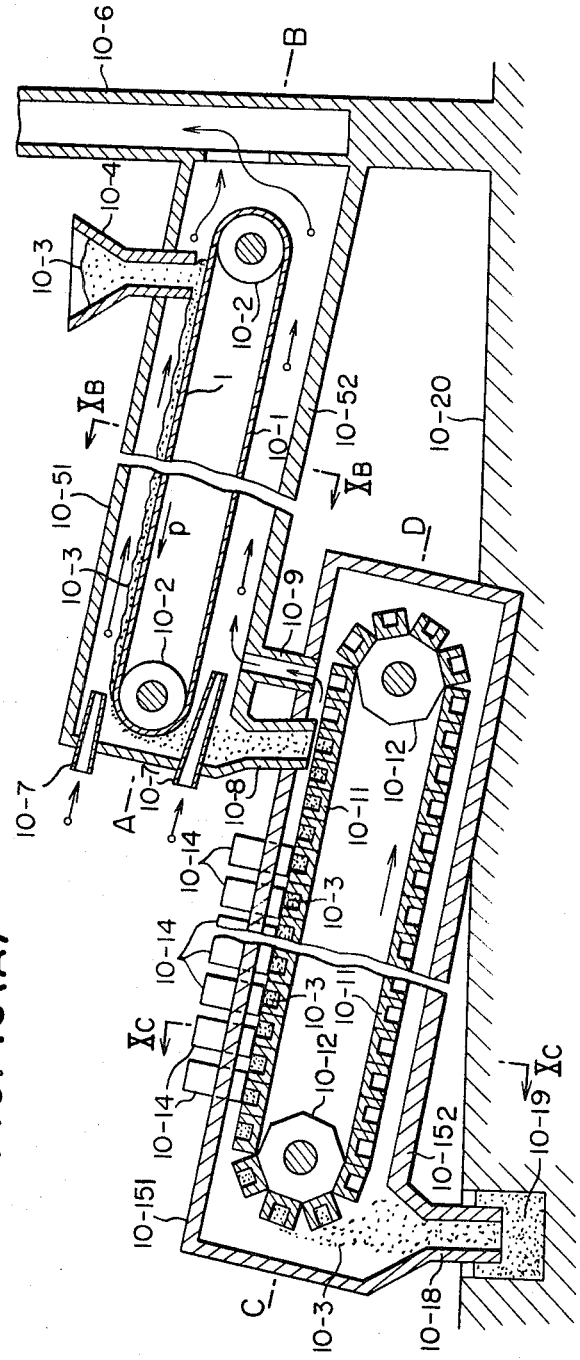

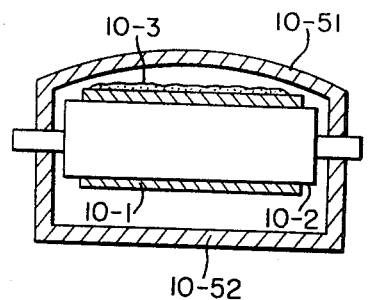
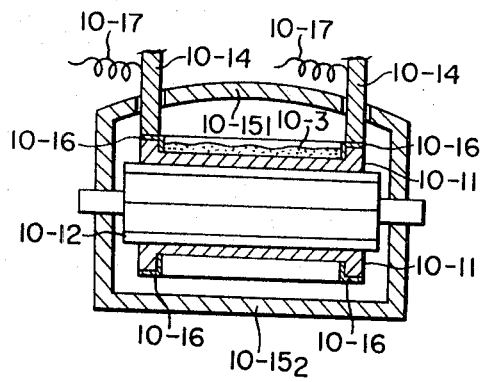

DEVICE FOR MANUFACTURING IRON OR NON-ORE-SMELTING TYPE

BACKGROUND OF THE INVENTION

Generally, iron ore used most usually as an iron-manufacturing raw material consists of three kinds of oxides, namely, hematite ($Fe_2O_3$), magnetite ($Fe_3O_4$) and limonite ($2Fe_2O_3 \cdot 3H_2O$).

There are two steps to be carried out in order to produce iron out of these oxides: the first step is to separate (to reduce) oxygen chemically combined with iron, and the second step is to separate a gangue material mechanically combined with iron (this step is called "Separation of Iron from Gangue Material"). A system employed most generally as the former step, namely, the reduction of the iron ore, is one in which the material for manufacturing iron is heated in combination with material (reducing agent) stronger in affinity than iron with respect to oxygen. Solid carbon (coke) is most often used as a reducing agent.

As for the latter step, that is, the separation of iron from gangue material, the iron ore is subjected to both heat to weaken the combining force between iron and gangue material and to a force to separate iron from gangue material, simultaneously. In conclusion, one of the fundamental elements in manufacturing iron is to apply both heat and force to the iron ore at the same time.

In the study of a conventional iron-manufacturing system, there has been a tendency to place emphasis on only energy of heat, though it has been well known that both energy of heat and force is necessary for manufacturing iron, and the force has been obtained by depending on gravity. Furthermore, the heat necessary for the conventional iron-manufacturing has been actually dependent on primitive combustion heat (manifestive heat).

In other words, it is obvious that the complete smelting of ore is absolutely required for production of iron as far as it depends on gravity as a separating force. In order to accomplish the complete smelting of ore, required are rich ore, rich coal, or poor ore and coal enriched in advance. At the same time, the smelting point of slag must be lowered by preparing gangue material and the combustion temperature must be raised by increased air-blowing power. Therefore, raw material suitable for the ore-smelting method is exhausted, and consequently the cost of the raw material goes up. Due to these conditions in combination with the large scale equipment required for the ore-smelting method, the cost of manufactured iron is greatly raised.

SUMMARY OF THE INVENTION

It is accordingly the primary object of the present invention to provide a novel device for manufacturing iron which is acceptable from an industrial view point and is most economical.

Another object of the present invention is to provide a novel device for manufacturing iron, in which iron particles (or iron mass) are separated from gangue material with the aid of Joule heat and electromagnetic force which are produced by feeding an alternating current directly to the accumulation of an iron-manufacturing raw material in the form of powder or particles.

A further object of the present invention is to provide a device for manufacturing iron, in which a tubular electrical rotary kiln comprising a pre-heating section and an iron-manufacturing section, is inclined and rotatably arranged under the condition that the iron-manufacturing section is placed below the preheating section. A plurality of annular electrodes which are provided at a mutually proper interval and which serve to supply an alternating current to the accumulation of a powdery or granular raw material conveyed successively in the iron-manufacturing section, are provided in the iron-manufacturing section.

A still further object of the present invention is to provide an iron-manufacturing device which comprises a tunnel kiln inside which a metallic endless belt is provided to convey powdery and granular raw material, and a preheating device adapted to heat both the upper and lower surfaces of the thin accumulation of the powdery and granular raw material spread on the endless belt.

A particular object of the present invention is to provide an iron-manufacturing device, in which a plurality of refractory unit crucibles which are in the form of a rectangular hexahedron with an open plane and which receive a preheated powdery and granular raw material, are arranged to form an endless belt, each of the unit crucibles being provided with a pair of movable electrodes cooperating with a plurality of external electrodes arranged on an externally surrounding structure. Iron granules (or iron mass) are separated from pumice-type slag (or gangue material) in each of the unit crucibles.

The nature, utility, and principle of the invention will be more clearly understood from the following detailed description with reference to the accompanying drawings.

BRIEF DESCRIPTION OF THE DRAWING

In the accompanying drawings:

FIGS. 8(A) through 8(C) are a longitudinal sectional view, of an embodiment of the present invention, a longitudinal sectional view of its essential part, and a view sectioned along line $VIII_C - VIII_C$ in FIG. 8(B), respectively;

FIG. 10(A) shows another embodiment of the present invention, which utilizes the unit crucibles shown in FIGS. 9(B) through 9(E); and FIGS. 10(B) and 10(C) are sectional views taken along the line $X_B - X_B$ and the line $X_C - X_C$ of FIG. 10(A), respectively.

DETAILED DESCRIPTION OF THE INVENTION

The present invention relates to a novel device for manufacturing iron, in which Joule heat of an alternating current directly flowing in the powdery and granular raw material of iron ore is utilized as heat required for separation of an iron component and gangue material which are contained in the iron ore, i.e., for a refining process, and an electro-magnetic force based on said current is utilized as a force for the separation; and further relates to a device to carry out the method.

It is the most industrial and economical means to reduce an iron component in ore by only heating a mixture of ore and coke. However, in this case, the fundamental elements governing the reduction rate and the reduction efficiency are the specific surface area of the raw material, and the conduction rate and conduction efficiency of heat to be given to the raw material. In addition, the specific surface area of a solid substance is inversely proportional to the grain size. Therefore, a mass substance is the hardest to reduce, while a powdery and granular substance is the easiest. Accordingly, it will be apparent that, if heat is applied at a high rate and a high efficiency up to the center of the accumulation of the powdery and granular raw material, the most superior reduction process can be obtained.

As described above, one of the conditions under which the reduction rate and the reduction efficiency are maximized is the fact that "the grain size of the raw material is small," and the other is the fact that "heat penetration is sufficiently appropriate to the raw material." However, as a gas medium, which has the lowest heat conductivity among the component, is interposed in the accumulation of the powdery or granular raw material, the accumulation is extremely low in heat conductivity.

Therefore, this is a problem which cannot be solved by the classical method of manufacturing iron in which the manifestive heat is utilized.

Figure 1:
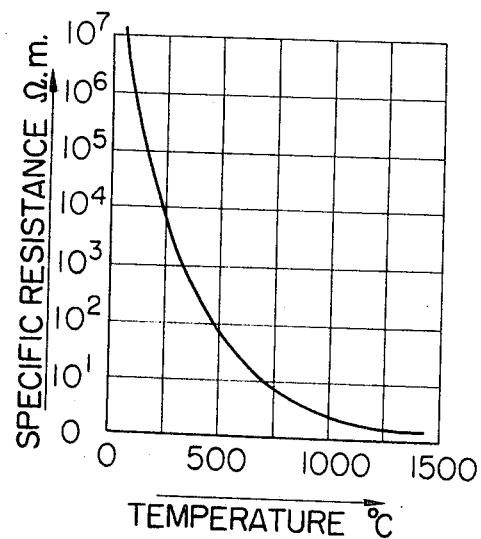
FIG. 1 is a graphic diagram illustrating the relationships between specific resistance and temperature when heating an accumulation of a powdery and granular raw material.
Figure 2:
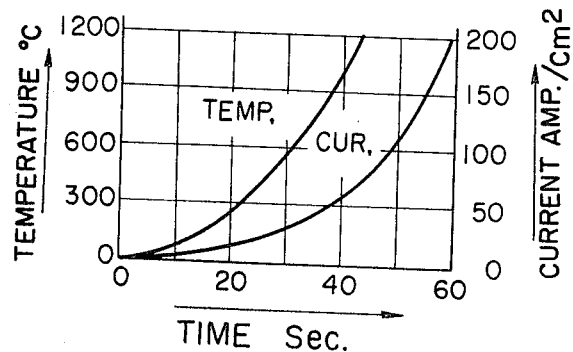
FIG. 2 is also a graphic diagram illustrating both the relationships between time and temperature of the accumulation, and the relationships between time and a current density flowing through the accumulation of a powdery and granular raw material in the case when a certain voltage is applied to the accumulation.

On the other hand, it has been found that the electrical resistance of the accumulation of the powdery or granular material comprising the mixture of substances each of which is negative in the temperature coefficient of electrical resistance as found in ceramics, coke, and iron ore comprising various metal oxides, is also negative in the temperature coefficient, and the absolute value of the negative value is extremely high. Moreover, when the accumulation is heated, the electrical resistance is prominently lowered and the lowering variation of the electrical resistance is notable in the range of a relatively low temperature, as shown in FIG. 1. Therefore, it will be understood that, when the powdery or granular material is subjected to heat, the resistance due to this heating operation is lowered rapidly and consequently an electric current rapidly passes through the raw material. It is one of the most important and fundamental elements that the conductivity of a current with respect to the powdery or granular raw material is increasingly improved by heating the material. The above-mentioned current (electron current) cannot pass through the accumulation of the powdery or granular material at a normal temperature. However, by heating the accumulation, the current can readily pass through it and collides with atoms and molecules constituting the accumulation whereby energy of motion possessed by each electron is converted into energy of heat. In this case, the penetrating rate of heat in the powdery or granular raw material is equal to the current conducting rate.

On the contrary to the above description, the combustion heat or manifest heat employed heretofore shows little penetrating action with regard to the accumulation of the powdery or granular raw material.

This is due to the following reasons: that is, the combustion heat is the energy of motion of gas molecules (for instance, $CO_2$, $H_2O$, and the like) which are produced by combustion. These molecules are extremely larger in size and mass than the electron. Therefore, it is hard for the molecules to penetrate into the accumulation of the powdery or granular raw material. Accordingly, all the manifest heat collides with the surface of the accumulation, and is then converted into heat energy on the surface. Then, the heat energy thus converted is introduced towards the inside of the accumulation. However, the substance constituting the accumulation of the powdery or granular raw material comprises ceramics, coke, and gas filled in the powder and granules thereof any of which are low in heat conductivity. Therefore, the heat conductivity in the accumulation could be regarded as almost zero.

According to the present invention, Joule heat is produced inside the accumulation of powdery or granular material by supplying an alternating current to the accumulation, and the thus produced Joule heat is adapted to heat the raw material at a high rate and a high efficiency, whereby both the reduction rate and the reduction efficiency can be remarkably improved.

As apparent from FIG. 1, when the accumulation of the powdery or granular raw material is heated, the specific resistance of the accumulation is abruptly lowered. Therefore, it can be anticipated that a current can easily pass through the accumulation if it is pre-heated. The accumulation of the powdery or granular raw material is (1) negative in the temperature coefficient of electrical resistance, (2) very low in heat conductivity, and (3) extremely nonuniform in organization. In other words, the properties of the accumulation are just the opposite of those of metal. Therefore, it can be naturally anticipated that, when a current is supplied directly to the powdery or granular accumulation, the current-passing phenomena are greatly different from those in a metallic conductor. For instance, the metal is highly homogeneous in organization and uniform in resistance distribution. Accordingly, in the metal, the current density is uniform all through the metal and the current is diffused through the metal with a lapse of time. On the contrary, since the powder or granule accumulation is exceedingly nonuniform in organization, a great local deflection is observed in each of the electrical resistance, current density and heating value thereof, as a result of which the diffusion and assimilation of the current are obstructed in conjunction with the extremely low heat conductivity. In many zigzag current courses substantially in parallel which are thus produced in the powdery and granular accumulation and which are different from each other in power, a strong current course becomes increasingly stronger with a lapse of time, and consequently a difference between the strong current course and a weak current course is increased. Finally, all the current paths through the powdery or granular accumulation being in contact with a pair of electrodes, concentrate to only one zigzag current course. This phenomenon is called "concentration of electric current."

Now, the concentration of electric current is analyzed hereinafter:

The lowering rate ($V$) of the resistance of the powdery or granular accumulation is proportional to the temperature-raising rate ($V_1$) of the same, the temperature raising rate ($V_1$) is in turn proportional to the power-increasing rate ($V_2$) of a current, while the power-increasing rate ($V_2$) is proportional to the firstly mentioned lowering rate ($V$) of the resistance of the powdery or granular accumulation. In other words, the above relationships can be expressed by a formula: ($V$) $\alpha$ ($V_1$) $\alpha$ ($V_2$) $\alpha$ ($V$). Those factors establish the relation of cause and effect among themselves, and grow up through a chain-circulation.

Now, it can be understood that, when a voltage to be applied is fixed to a certain value, both the temperature of the powdery or granular accumulation and the current density flowing through the same increase in a parabolic manner for lapse of time, i.e., in proportion to the square of lapse of time. In addition, the growing rate of the electric current concentration phenomenon is of course proportional to the applied voltage. It is one of the great specific features of the present invention that the current strength and the growing rate can be optionally controlled. It is considered proper as supplying condition of the electric current from an industrial view point that a voltage of 50 – 60 cycle/sec and 100 volt/m is applied to the powdery or granular accumulation preheated at 800° C, and the final current density is made to the order of 100 ampere/cm² by passing the current for 30 to 60 seconds. In this case, the current concentration action will not be extremely developed due to the following reasons; that is, (1) the resistance-lowering action due to temperature is saturated at a high temperature, (2) the heat insulation character of the powdery or granular accumulation is lowered at the high temperature. In other words, the cross-sectional area of the concentration of electric current is delimited to a certain amount defined by the nature of the raw material. According to an experiment as to this, when a voltage of 50 cycles and 50 to 200 volt/m was applied thereto, the cross-sectional area of the current-passing course was from 25 cm² to 35 cm². Therefore, it can be obviously utilized as a basis to plan a method and a device for industrializing the method of directly passing current in that there is a limitation in the cross-sectional area of the current-passing course.

Now, separation of an iron component and gangue material will be considered in detail. In order to effect the separation of the iron component and the gangue material, both heat ($H$) to weaken the strength of a force combining the iron component and the gangue material and a force ($F$) to detach them must be applied thereto at the same time. It is well known that the heat ($H$) and the force ($F$) in this case, are inversely proportional to each other. Therefore, it is due to an insufficient F, namely the effect of gravity that metal and gaugue material are separated not only in the case of manufacturing iron but also in the conventional method of smelting ore. Accordingly, if one can find any force stronger than gravity, which is useful in the separation of iron from gangue material, the separation of iron from gangue material can be carried out even from solid ore softened slightly and from semi-smelted ore also, even though the ore is not completely smelted. According to the conventional method, the following are required for completely smelting the raw material: obtaining rich ore and rich coal, or enriching poor ore and poor coal, heating up blowing air at a high temperature, adding heavy oil and oxygen, and providing with a furnace member resistive against a high temperature. However, if a method of manufacturing iron at a low temperature lower than 1,000° C in which smelting of ore is not necessary is established, all the requirements itemized above are eliminated, and therefore iron can be manufactured at a low cost.

Figure 3:
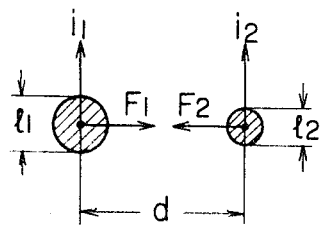
FIG. 3 is a diagram explaining the interaction of electromagnetic forces produced when a current is made to flow through two conductors placed adjacently.

Now, let it be assumed that two spherical metal particles, whose diameters are $\lambda_1$(cm) and $\lambda_1$(cm) respectively, are placed at an interval of $d$ (cm), and parallel currents of $i_1$ ampere and $i_2$ ampere flow through the particles, respectively, as shown in FIG. 3, according to Biot-Savart's law mutual attraction forces $F_1$ dyne and $F_2$ dyne act on the particles, respectively. The magnitudes of the forces are represented by the following formulas:

$$F_1 = 0.02 \ (i_1 i_2/d) \ \lambda_1 \ (\text{dyne})$$
$$F_2 = 0.02 \ (i_1 i_2/d) \ \lambda_2 \ (\text{dyne})$$

Figure 4:
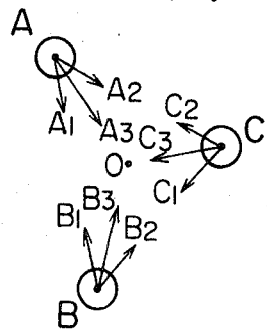
FIG. 4 is a diagram to illustrate an electromagnetic coagulation according to the present invention.

Thus, the magnitude of the attraction force imparted between the iron particles is proportional to the product of the magnitudes of currents flowing through the iron particles respectively. Therefore, when the current density increasing grows up to 100 ampere/cm² at the end period of the concentration of electric current, the magnitude of the force for separating iron from gangue material is approximately fifteen times as much as that in the case of employing gravity. In addition, since the force is in "a direction of mutual attraction," this fact produces the following effective actions:

(1) Electro-magnetic coagulation:

With reference to FIG. 4, when electric currents are made to flow, in a direction perpendicular to the sheet of the figure and downwardly from above the sheet, to three metal particles A, B and C, respectively, mutual attraction forces as shown by arrow marks $A_1$, $A_2$, $B_1$, $B_2$, $C_1$, and $C_2$ are imparted to the metal particles, respectively. Now, assuming that the particles are movable, they move in the directions of arrow marks $A_3$, $B_3$ and $C_3$ and then come together at a point 0. In this case, it is a common knowledge in a powder metallurgy that, if the temperature of each particle is above two-thirds of its melting point, the thus concentrated particles become a single crystal.

Thus, countless metal particles scattered in the gangue material move towards the center among electric currents and coagulate in the form of a metal rod whose center axis is the center line among the electric currents. This phenomenon will be called "Electromagnetic coagulation."

Figure 5A:
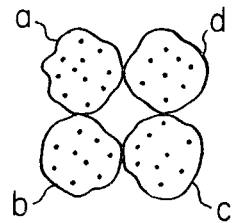
FIG. 5 is a diagram illustrating the process in which iron components and other components are successively separated from granular ores containing iron components, under the electromagnetic coagulation action.
Figure 5B:
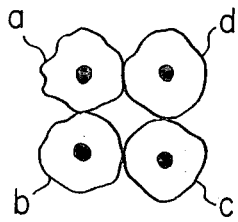
Figure 5C:
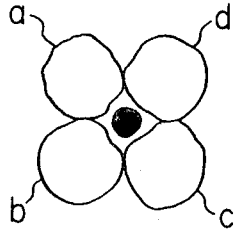
Figure 6:
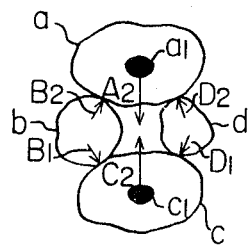
FIG. 6 is a diagram exhibiting a phenomenon that an attraction force (centripetal force) is imparted to granular ores containing an iron component under electromagnetic coagulation action, according to the present invention.

Referring now to FIG. 5(A) metal particles shown by black dots and scattered in ore particles $a$, $b$, $c$ and $d$ are firstly coagulated into larger metal particles as shown in FIG. 5(B). The thus coagulated metal particles are secondarily extracted outside the ore particles as shown in FIG. 5(C). Thus, the metal particles grow up into a rod-shaped iron through the coagulations of the third, the fourth and so on. However, in the case when the electro-magnetic coagulation is carried out for the raw material being agitated in the rotary kiln, the iron to be formed into a rod is cut into pieces thereby to form granular iron. Furthermore, when a force acts in a single direction as found when using gravity or a centrifugal force, the separation of iron from gangue material cannot be carried out without a furnace bottom (in case of the gravity) or a furnace wall (in case of the centrifugal force). On the contrary, in the case of the mutual attraction force, the directions of forces are mutually opposed as shown in FIG. 6, and the gangue material itself is adapted as a supporter. Therefore, such furnace bottom and furnace wall are not required for the separation of iron from gangue material. With reference to FIG. 6, there are ore particles $a$, $b$, $c$, and $d$, metal particles $a_1$ and $c_1$ are shown with black dots, electro-magnetic forces $A_2$ and $C_2$ acting on the metal particles $a_1$ and $c_1$ are shown with arrow marks, and arrow marks $B_1$, $B_2$, $D_1$, and $D_2$ represent the reactions acting on the contact points of the ore particles so as to counter-act the respective electro-magnetic forces $A_1$ and $C_1$. Omission of the bottom or wall supporter means eliminates the need for refractory bricks. In addition, this makes it possible to manufacture iron by a rotary kiln, though its has been limited in the past due to the corrosion occurring in the refractory bricks and to the adhesion of slag, and a mass-production mechanism employing an endless belt, which can be used only in the case of a non-ore-smelting process, can be utilized for manufacturing iron.

Now, the automatic control for supplying an electric current to the raw material, will be considered.

After all the reduction metal particles contained in the raw material have been extracted, the electrical resistance of dross material is rapidly increased. Therefore, at the same time as the extraction of the metal, the current flowing in the dross material is automatically stopped. This fact is one of the reasons by which the non-ore-smelting method can be established. Thus, according to the present invention, metal contained in powdery or granular ores can be completely extracted, while no current flows to particles formed into dross material. Those specific features can be effectively utilized for manufacturing iron. Therefore, even if poor ore and poor coal are used as the raw material without being enriched, a method of economically manufacturing iron can be obtained.

According to the present invention, the current made to flow in the raw material in order to reduce or to heat the ore can be used as it is, for the electro-magnetic force action also, and the reduction is scarcely completed when the separation of iron from gangue material also is completed.

Hereinafter, a specific device in accordance with the present invention will be described.

For supplying an electric current directly to the powdery or granular raw material according to the present invention, it is required to preheat the powdery or granular accumulation so as to reduce its specific resistance. It is a first problem how to preheat the powdery or granular accumulation. When the current is made to flow through the thus preheated raw material, the current density becomes condensed partially (forming zig-zag courses). However, the growing period of time (to complete the reduction and the separation of iron from gangue material) is relatively short (30 to 45 seconds), and the sphere (the cross-sectional area of the zigzag course) where the concentration of the electric current is produced is narrow in area (25 to 35 cm$^2$). Accordingly, in order to improve the yield thereof, the current must be made to flow through the raw material little by little. This method of supplying the current thereto is a second problem.

Next, by means of the concentration of electric current the iron is separated from the gangue material and the current flowing into the dross material is automatically ceased, but the current is still kept flowing into the powdery or granular iron or into the rod-shaped iron. It is a third problem how to interrupt this large current.

Finally, the temperature of the granular iron and the rod-shaped iron separated from the gangue material is considerably high (approximately 1,000° C). Therefore, when the iron comes in contact with oxidizable gas, their surfaces are oxidized. It is a fourth problem how to prevent this phenomenon.

In the first problem, since the preheating temperature is relatively low (850° C in maximum), the combustion heat of a volatile substance produced through the dry distillation of granular coal and CO gas produced without fail in the reduction of the iron ore with coke, should be utilized for the preheating heat. In other words, air should be sufficiently furnished to the preheating zone thereby to burn and remove P, S, As and the like from the raw material.

The fourth problem can be solved by putting into water the granular iron and the rod-shaped iron delivered from the furnace and then introducing the steam produced thereby into the furnace so as to effect a heat-exchange with the raw material present in the furnace.

With regard now to the second and the third problems, there are two methods to solve the problems: One is a method (A) in which an electric current is made to flow through the raw material being agitated, on the basis of the principle that "no current flows to the dross material." The other is a method (B) in which an electric current is made to flow through the thin and long granular accumulation whose cross-sectional area is in the order of 25 to 35 cm$^2$, on the basis of the principle that "under the concentration of an electric current the current does not substantially flow."

The condition common to both methods (A) and (B) is that intermittent current flows and that the current is made to flow into the same portion for about 30 to 45 seconds and is then interrupted.

In addition, in order to increase the iron production quantity, the distance between electrodes should be increased in the method (A), while the number of the granular accumulations cut slenderly and a transferring rate of the accumulation should be increased in the method (B). Accordingly, a rotary kiln is best suitable for the method (A) and a tunnel kiln having an endless caterpillar belt therein is best suitable for the method (B).

In the inclination type cylindrical electrical rotary kiln, there is no limitation in length, and both a preheating section and an iron-manufacturing section can be provided in one furnace. On the other hand, though the concentrative current flowing course is limited in its cross-sectional area, the course has no limitation in length. Therefore, if the direction of the current-flowing course is coincided with the direction of the furnace axis, the iron production quantity per one flowing of an electric current can be increased. Moreover, if the raw material inside the furnace is maintained in agitation by friction produced between the raw material and the inside wall surface of the furnace, while a desired rotating speed of the furnace is maintained, the inside wall surface of the furnace and the raw material continue an intermittently contacting motion with each other.

Figure 7:
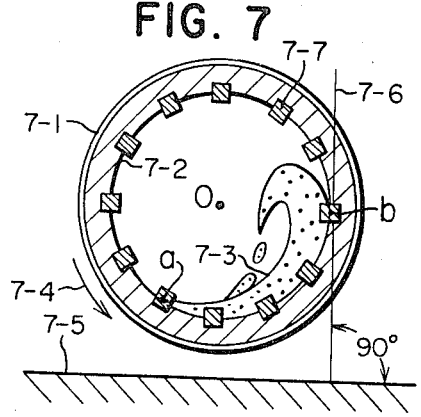
FIG. 7 is a vertical section view of an electrical rotary kiln, according to the present invention, which illustrates the agitation condition of raw material in the kiln.

FIG. 7 shows a cross-sectional view or a rotary kiln to illustrate the above-mentioned intermittently contacting motion. In this figure, reference symbol 7-1 is for a furnace shell, 7-2 for an inside wall surface, 7-3 for powdery or granular raw material, 7-4 for the rotating direction of the kiln, and 7-5 for grounding.

As apparent from FIG. 7, the raw material inside the kiln repeats an agitating motion due to the rotating motion of the kiln. Now, with regard to the contact conditions between the inside wall surface of the kiln and the bottom surface of the raw material accumulation which is crescent-shaped in its cross-section, a part of the accumulation which comes in contact with the inside wall surface at a point ($a$) is kept in contact with the inside wall surface until the part reaches a point ($b$), i.e., a contact point where a tangential line 7-6 perpendicular to the earth touches the inside wall surface. The part of the accumulation collapses when it passes the point ($b$). In this case, a period of time required for the part to move from the point ($a$) to the point ($b$) is approximately 20/ r.p.m. (second). Therefore, the required time will be 40 seconds in case of r.p.m.=½, and is equivalent to the growing time of the concentration of an electric current, described previously.

However, in case of an industrial embodiment the present invention, the inside diameter of the rotary kiln should be at least 4 meters. Accordingly, the cross-sectional area of the crescent-shaped accumulation of powdery or granular raw material will be at least 2.5 m$^2$ = 25,000 cm$^2$ for maintaining proper the raw-material-supplying conditions. However, by the concentrative electric-current-passing action there is produced only one thin electric-current passing course of 25 to 30 cm$^2$ in the above-mentioned extremely large sectional area during a time period of 120° rotation = ⅓ rotation. This is not economical in the operation of the rotary kiln. Therefore, it is preferred so as to simultaneously multiply the number of the electric current passing courses therein that, as shown by reference number 7—7 of FIG. 7 and 8-15 of FIGS. 8(A) and 8(B), substances which are in the form of stepping-stones or stepping-islands and which are made of matter such as carborundum brick or graphite brick being much lower in specific resistance than of the powdery or granular raw material, are provided at proper intervals on an inside wall surface between two adjacent electrodes. In other words, when these stepping-stones are buried in the powdery or granular accumulation, several (any desired number of) successive electric-current-passing courses are produced in parallel with one another. The courses respectively lie on minimum distances between both electrodes connecting the stepping-stones and the powdery or granular accumulation in series, and are particularly low in electric resistance. Consequently, any desired number of electric-current-passing courses can be produced in the same accumulation at the same time.

FIG. 8(A) is a longitudinal section view taken along the central axis of a tubular electrical rotary kiln which is broadly divided into two sections, namely, a preheating section (I) and an iron-manufacturing section (II). The rotary kiln comprises a tubular kiln body 8-1 containing the powdery or granular raw material 8-2, a hopper 8-3 supplying the raw material into the kiln and an air-supplying pipe 8-4. The air-supplying pipe 8-4 is adapted to supply air into the kiln, and with the aid of the thus fed air both inflammable gas and poisonous gas (S, P, As and the like) produced from the raw material are burnt and removed, and further the heat obtained by the combustion of said gases is utilized for preheating the raw material. Annular electrodes 8-5 made of carborundum are adapted to reduce and coagulate the iron component contained in the raw material positioned between the adjacent electrodes, thereby to separate the iron from the gangue material. A pool 8-6 is provided for cooling down the separated granular iron and the gangue material. Various arrow marks indicate the flowing directions of respective gases. Reference symbol 8-7 shows a funnel, 8-8 shows ground and 8-9 shows an oil burnner provided for assisting in heating, in the case of starting the operation of the kiln and in other cases.

In such device, if the combustion is adjusted so as to maintain the temperature of gas inside the kiln at 850° C maximum, the raw material passes through the interior of the kiln in a solid state; during which both the reduction and the separation of iron from gangue material is completed by supplying the electric current directly to the raw material so that the raw material is changed into pumice-like slag containing virtually no iron component, and granular iron of a large size (82 percent: more than 5 mm in grain size, 9 percent: 5 to 3 mm, 8 percent: less than 3 mm), and falls into the pool so that the heat maintained thereby is exchanged with evaporation heat.

Figure 8B:
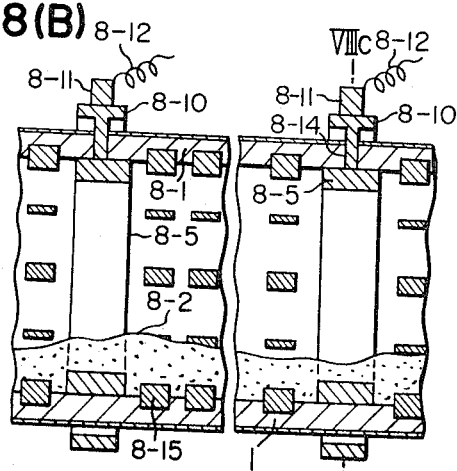
Figure 8C:
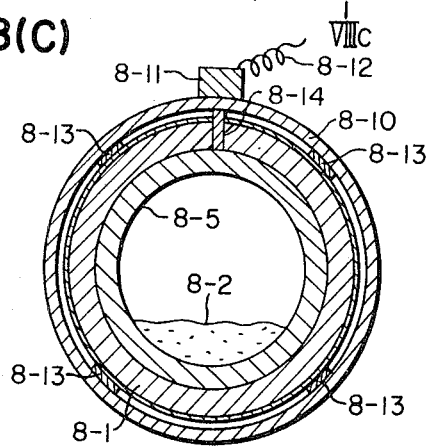

Shown in FIG. 8(B) is a part of the longitudinal section view of the tubular electric rotary kiln, where electric power is supplied to the electrodes.

A ring collector 8-10 made of metal is insulated from the tubular kiln body 8-1 by means of an electrically insulative support 8-13. The ring collector 8-10 is connected to the annular electrode 8-5 through a metallic connecting bar 8-14 insulated electrically from the tubular kiln body 8-1. A brush 8-11 made of graphite is slidably arranged in contact with the outside of the ring collector 8-10. Each brush 8-11 is connected to a power supply through an electric wire 8-12.

When this electric current is cut by the agitating action as shown in FIG. 7, sparks may occur between the thus cut portions. However, strong sparks are not caused at any portion, because the cutting action due to the agitating action is carried out among countless particles and further there are a number of courses in the accumulation in contact with both annular electrodes. Productivity of iron can be improved by increasing distance and number of stepping stone courses between both electrodes, the number of electrodes, or the applied voltage.

Described hereinafter is the tunnel kiln in which a caterpillar type endless belt is built.

In this device, the combustion heat produced when both CO gas necessarily produced from the raw material in the process of reduction and gas necessarily evaporated from the raw material in the process of preheating are burned with air, is utilized for preheating, and both Joule heat and electromagnetic force are utilized for the reduction and the separation of iron from gangue material.

In order to heat by the combustion heat the powdery or granular accumulation having a heat-resistive property and being stationary, it is necessary to make the thickness of the accumulation as thin as possible and to heat the thus formed accumulation from both a front and a rear surface thereof.

In this embodiment, firstly the endless belt made of metal is preheated by the combustion heat of CO gas produced during the reduction process, then the powdery or granular raw material is thinly spread over the thus preheated endless belt. Further air is fed into the inflammable gas produced from the thin accumulation, and finally the combustion heat produced by burning the gas is adapted to heat the thin accumulation from its surface. At the same time sulphur, phosphorus and the like are removed during combustion.

In order to supply an electric current to every part of the whole accumulation by supplying the current directly to the powdery or granular accumulation being kept stationary, the cross-sectional area perpendicular to a direction of the current flowing through the accumulation should be 25 to 35 cm$^2$, on the basis of the previously mentioned principle that "an electric current concentrating action is not exceedingly advanced." The reason for this resides in that the cross-sectional area of the concentrative current flowing course which can be industrially produced in the accumulation of the powdery or granular raw material by supplying an electric current having a commercial frequency and a commercial voltage directly to said raw material, is 25 to 35 cm$^2$.

With reference now to FIG. 9, an endless belt 9-2 made of metal is driven by a pulley 9-1 connected to a driving means (not shown), and the powdery or granular raw material is thinly spread on the endless belt. In the case of preheating the thus formed thin accumulation of the raw material with combustion heat, the thin accumulation moving towards the direction of an arrow mark 9-4 can be heated from above and below. However, in case of supplying the electric current directly to the thin accumulation, it is unknown where the electric current flowing courses are produced. Accordingly, it is necessary to divide the thin accumulation into small pieces and to forcibly produce the concentration of electric current in each of the small pieces.

A rectangular hexahedron having a section abcd as shown in FIGS. 9(A) through 9(F) represents such a piece.

Figure 9A:
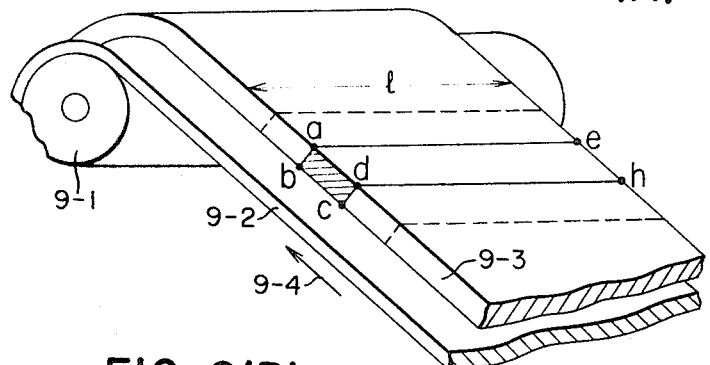
FIG. 9(A) is a diagram explaining the principle of the invention when processing the accumulation of a powdery and granular raw material fed successively by an endless belt.
Figure 9B:
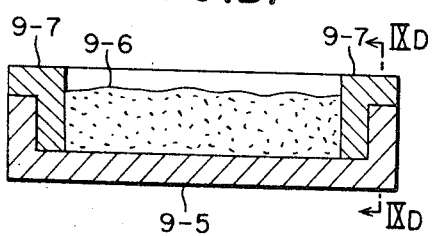
FIGS. 9(B) through 9(E) are an elevation view of a section of a unit crucible which is in the form of a rectangular hexahedron with an open plane and which actually forms the endless belt shown in FIG. 9(A), a plan view of the unit crucible, a sectional view taken along the line $IX_D - IX_D$ in FIG. 9(B) and a sectional view taken along the line $IX_E - IX_E$ in FIG. 9(C), respectively.
Figure 9D:
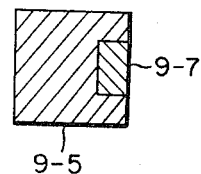
Figure 9C:
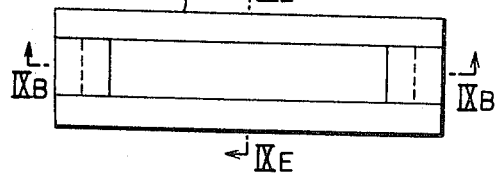
Figure 9E:
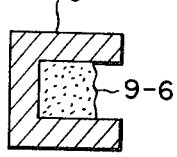
Figure 9F:
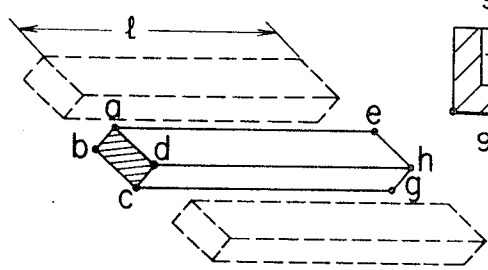
FIG. 9(F) is a diagram of the accumulation of a powdery and granular raw material shown in FIG. 9(A), which is in pieces extending perpendicularly to the moving direction of an endless belt.
Figure 9G:
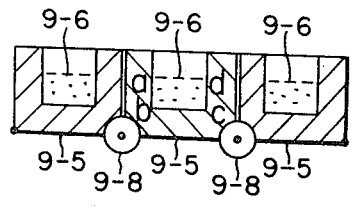
FIG. 9(G) is a sectional view of a part of the endless belt formed by connecting the unit crucibles shown in FIGS. 9(B) to 9(E), by using appropriate hinges at their bottom edge portions.

A unit current flowing region in the case of supplying the current in a direction ($\lambda$) can be obtained, if the area of the section abcd is made to be 25 to 35 cm$^2$. A crucible made of ceramic, which employs the above-mentioned unit electric current flowing region as its internal volume and which is of a rectangular hexahedron type with one open plane is prepared. Furthermore, electrodes are provided on both ends of the crucible thereby to compose a unit crucible. Shown in FIG. 9(B) is the unit crucible. The kiln body made of ceramic is provided with the electrodes 9-7 made of graphite at its opposed ends in a longitudinal direction, and the powdery or granular raw material 9-6 is filled inside the unit crucible. By connecting a number of unit crucibles with hinges 9-8 in the form of an endless belt as shown in FIG. 9(G), a device for manufacturing iron which moves slowly can be obtained.

Shown in FIG. 10 is a device for manufacturing iron, which consolidates in series a tunnel kiln inside which an endless belt for preheating is provided and a tunnel kiln inside which a caterpillar type endless belt for manufacturing iron is provided. In FIG. 10, a section including the endless belt having a center line A-B is a preheating device, while a section including the caterpillar type endless belt having a center line C-D is a device for manufacturing iron. First of all, the function of the preheating device will be explained hereinafter. The powdery or granular raw material 10-3 is supplied by a hopper 10-4 to the metal endless belt 10-1 being driven by a pulley 10-2 whereby the raw material is thinly spread on the endless belt 10-1. The tunnel kiln in the preheating section comprises a ceiling wall 10-51, a bottom wall 10-52, a gas-exhausting funnel 10-6, nozzles 10-7 to supply air, a feeding hole 10-8 through which the raw material is transferred to the iron-manufacturing section, and a gas-flowing hole 10-9 through which excessive CO gas flows out of the iron-manufacturing section.

The powdery or granular raw material on the endless belt is preheated from below the endless belt which is heated up by both the gas evaporated from the raw material by the air supplied through the nozzle 10-7 and the gas produced through the combustion of excessive CO gas supplied from the iron-manufacturing section. It goes without saying that the thin accumulation of the powdery or granular raw material 10-3 is preheated from its surface also.

Described below is the function of the iron-manufacturing section. The tunnel kiln of the iron-manufacturing section comprises a ceiling wall 10-151 and a bottom wall 10-152. Inside the tunnel kiln, a caterpillar type endless belt consisting of a number of unit crucibles 10-11 connected in the form of an endless belt is arranged in cooperation with sprocket wheels 10-12. Each of the unit crucibles is provided with a pair of electrodes on the inside surfaces opposed perpendicularly to the moving direction of the unit crucibles, respectively. Moreover, on the ceiling wall, a number of stationary electrodes 10-14 made of graphite and provided with lead wires 10-17 to the power supply, respectively, are installed so as to slidably come in contact with movable electrodes 10-16 provided on both ends of each of the unit crucibles 10-11 being moved. In such device, the preheated powdery or granular raw material 10-3 is successively fed into each of the unit crucibles through the raw material feeding hole 10-8, and there an electric current is fed directly to the raw material through said stationary electrodes 10-14 and movable electrodes 10-16. The powdery or granular raw material which has been subjected to the action of reduction and the action of the separation of iron from gangue material by this direct supplying of the electric current is separated into a bare-rod-shaped iron and pumice-like slag, and then the bare-rod-shaped iron and the pumice-like slag are transferred out to the pool 10-19 through the discharge hole 10-18. In addition, reference symbol 10-20 indicates ground in FIG. 10.

I claim:

1. A device for preheating powdery or grannular iron ore, said device adapted for use with an iron manufacturing system and comprising:
a tunnel kiln;
an endless belt made of metal elements mounted for movement within said tunnel kiln;
means extending through said tunnel kiln at a first end thereof to deposit a thin layer of said powdery or grannular iron ore on the upper surface of said endless belt;
passage means extending into said tunnel kiln for supplying thereto heated gas from said iron manufacturing system for preheating said endless belt at both the upper and lower surfaces thereof, thereby thoroughly preheating said thin layer of powdery or granular iron ore; and
discharge means at a second end of said tunnel kiln for discharging said preheated powdery or grannular iron ore from said tunnel kiln to said iron manufacturing system.

2. A device as claimed in claim 1, further comprising at least one nozzle means extending into said tunnel kiln for supplying thereto combustion means for aiding in the preheating of said thin layer of powdery or grannular iron ore.

3. A device for manufacturing iron from powdery or grannular iron ore, said device comprising
a longitudinal support structure;
an endless belt formed of a plurality of joined individual ore carrying means, said endless belt being mounted for movement longitudinally with respect to said support structure;
each of said ore carrying means comprising a refractory crucible in the shape of a rectangular hexahedron with one open plane forming an ore carrying chamber therein, said crucibles being mounted to form said endless belt with said ore carrying chambers thereof facing outwardly;
means positioned adjacent a first end of said endless belt for supplying said powdery or grannular iron ore to said ore carrying chambers;
each of said crucibles having at least one electrode integral therewith and in contact with said powdery or grannular material in said ore carrying chamber thereof;
at least one electrode mounted on said support structure and adapted to be connected to a source of high density electric current for contact with each of said electrode of said crucibles when said endless belt moves longitudinally of said support structure;
whereby high density electric current is applied to said powdery or grannular iron ore in each of said crucibles, thus separating the iron and gangue material in said ore; and
discharge means for discharging said separated iron and gangue material from said crucibles.

4. A device as claimed in claim 3, wherein each of said crucibles is formed of a ceramic.

5. A device as claimed in claim 3, wherein each of said electrodes of said crucibles is formed of carbon brick.

6. A device as claimed in claim 3, wherein each of said electrodes of said crucibles is formed of carborundum brick.

7. A device as claimed in claim 3, wherein each of said crucibles has a separate electrode on opposite ends thereof transverse to the longitudinal direction of said endless belt.

8. A device as claimed in claim 7, wherein said at least one electrode mounted on said support structure comprises a plurality of electrode sets, said electrode sets being spaced in the longitudinal direction of said support structure.

9. A device as claimed in claim 8, wherein each of said electrode sets comprises a pair of electrodes, one of each of said pair being positioned to contact one of said separate electrodes of each of said crucibles.

10. A system for preheating powdery or grannular iron ore and manufacturing iron thereform, said system comprising:
A. a device for preheating said powdery or grannular iron ore, said device comprising
a tunnel kiln;
a first endless belt made of metal elements mounted for movement within said tunnel kiln;
means extending through said first tunnel kiln at a first end thereof to deposit a thin layer of said powdery or grannular iron ore on the upper surface of said first endless belt;
passage means extending into said tunnel kiln for supplying thereto heated gas for preheating said endless belt at both the upper and lower surfaces thereof, thereby thoroughly preheating said thin layer of powdery or grannular iron ore; and
discharge means at a second end of said first tunnel kiln for discharging said preheated powdery or grannular material from said first tunnel kiln; and
B. a device for manufacturing iron from said preheated powdery or grannular iron ore, said device comprising:
a longitudinal support structure;
a second endless belt formed of a plurality of joined individual ore carrying means, said second endless belt being mounted for movement longitudinally with respect to said support structure;
each of said ore carrying means comprising a refractory crucible in the shape of a rectangular hexahedron with one open plane forming an ore carrying chamber therein, said crucibles being mounted to form said second endless belt with said ore carrying chambers thereof facing outwardly;
means positioned adjacent a first end of said second endless belt for receiving said preheated powdery or grannular iron ore from said preheating device and supplying said preheated ore to said ore carrying chambers;

each of said crucibles having at least one electrode integral therewith and in contact with said powdery or grannular material in said ore carrying chamber thereof;

at least one electrode mounted on said support structure and adapted to be connected to a source of high density electric current for contact with each of said electrodes of said crucibles when said second endless belt moves longitudinally of said support structure;

whereby high density electric current is applied to said powdery or grannular iron ore in each of said crucibles, thus separating the iron and gangue material in said ore;

discharge means for discharging said separated iron and gangue material from said crucibles; and passage means extending from said support structure to said passage means extending into said structure to supply heated gas from within said support means to said tunnel kiln.

11. A system as claimed in claim 10, further comprising at least one nozzle means extending into said tunnel kiln for supplying thereto combustion means for aiding in the preheating of said thin layer of powdery or grannular iron ore.

12. A system as claimed in claim 10, wherein each of said crucibles is formed of a ceramic.

13. A system as claimed in claim 10, wherein each of said electrodes of said crucibles is formed of carbon brick.

14. A system as claimed in claim 10, wherein each of said electrodes of said crucibles is formed of carborundum brick.

15. A system as claimed in claim 10, wherein each of said crucibles has a separate electrode on opposite ends thereof transverse to the longitudinal direction of said second endless belt.

16. A system as claimed in claim 15, wherein said at least one electrode mounted on said support structure comprises a plurality of electrode sets, said electrode sets being spaced in the longitudinal direction of said support structure.

17. A system as claimed in claim 16, wherein each of said electrode sets comprises a pair of electrodes, one of each of said pair being positioned to contact one of said separate electrodes of each of said crucibles.

* * * * *